Aug. 2, 1966  B. BORISOFF  3,263,529
TORQUE CONVERTER CONSTRUCTION
Filed June 26, 1963  6 Sheets-Sheet 3
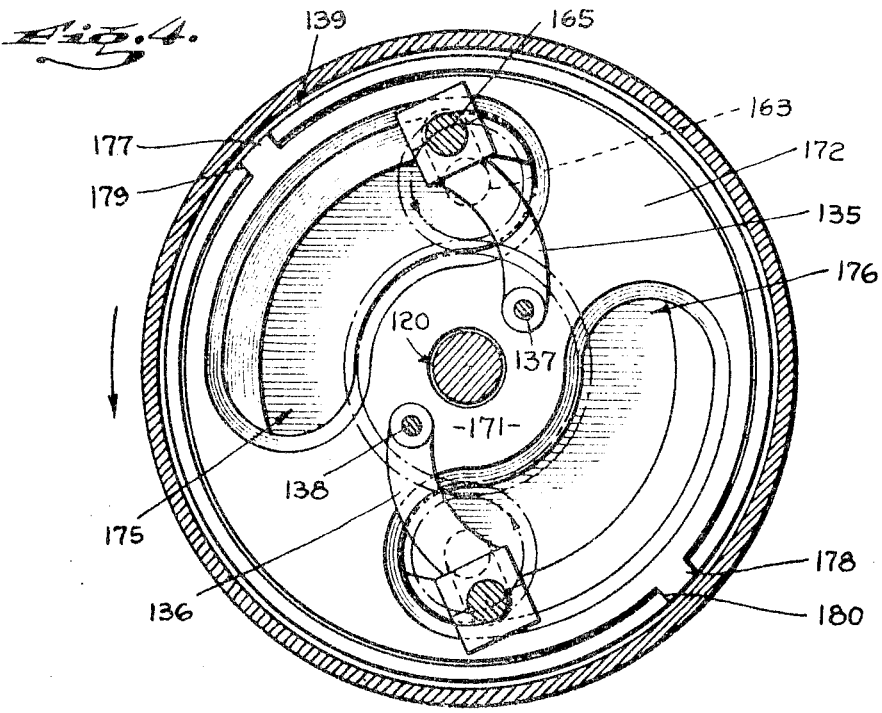
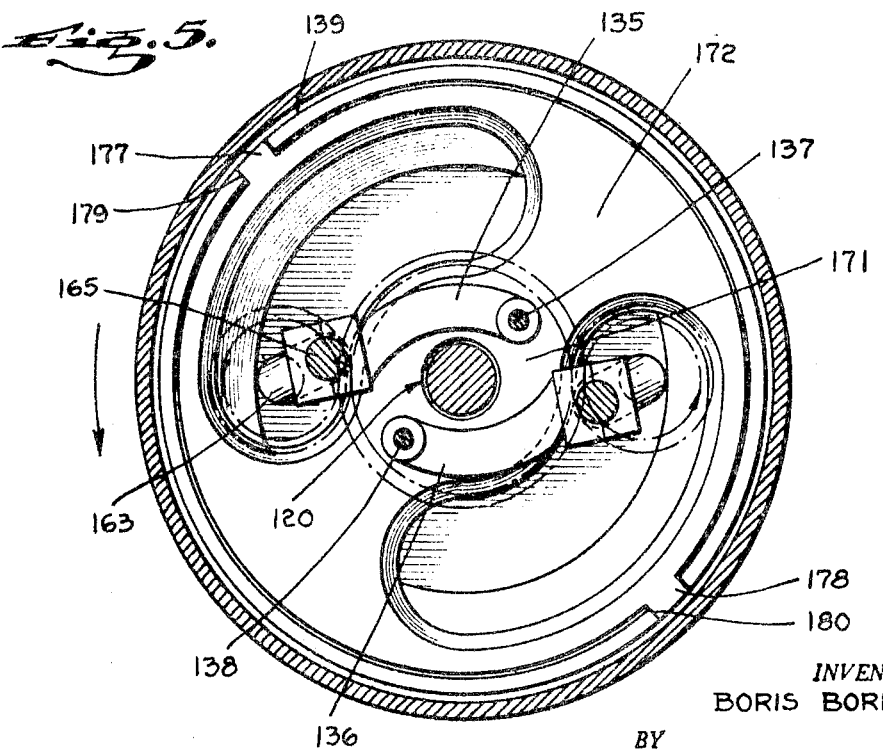
INVENTOR.
BORIS BORISOFF
BY
Mikutta and Glenny
ATTORNEYS Aug. 2, 1966  B. BORISOFF  3,263,529
TORQUE CONVERTER CONSTRUCTION
Filed June 26, 1963  6 Sheets-Sheet 4
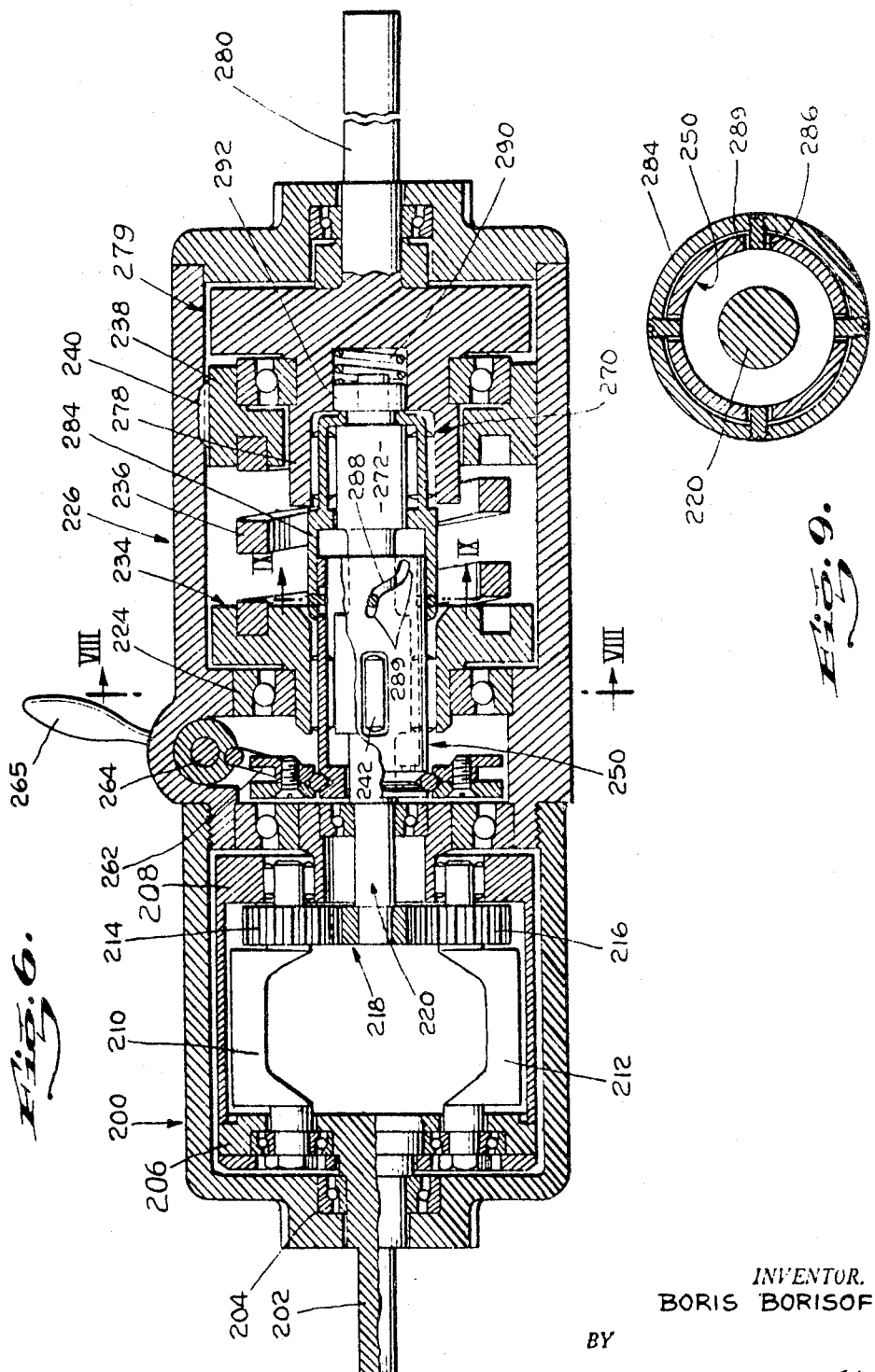
INVENTOR.
BORIS BORISOFF
BY
Miketta and Glenny
ATTORNEYS Aug. 2, 1966 B. BORISOFF 3,263,529
TORQUE CONVERTER CONSTRUCTION
Filed June 26, 1963 6 Sheets-Sheet 5
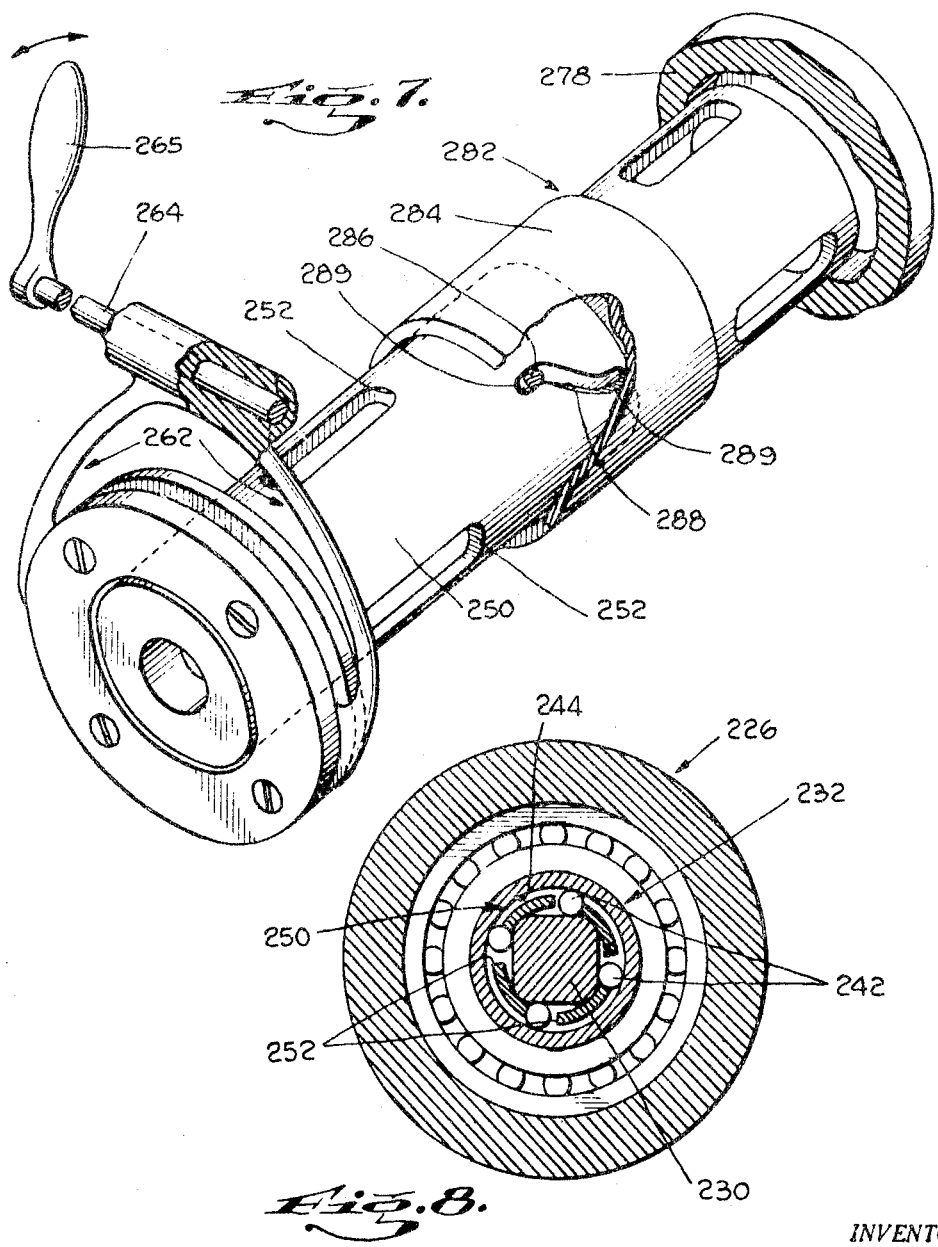
INVENTOR.
BORIS BORISOFF
BY
Miketta and Glenny
ATTORNEYS

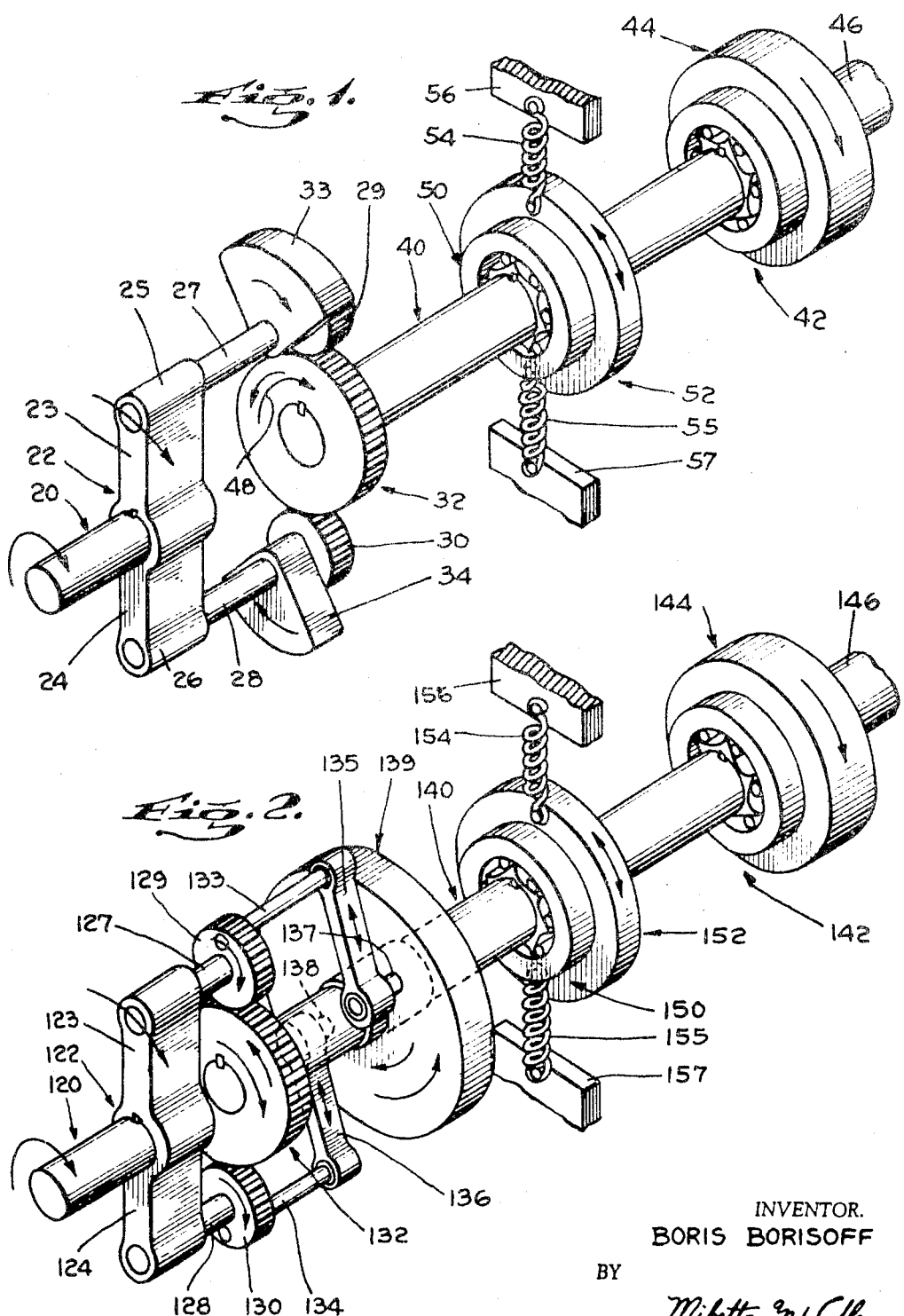

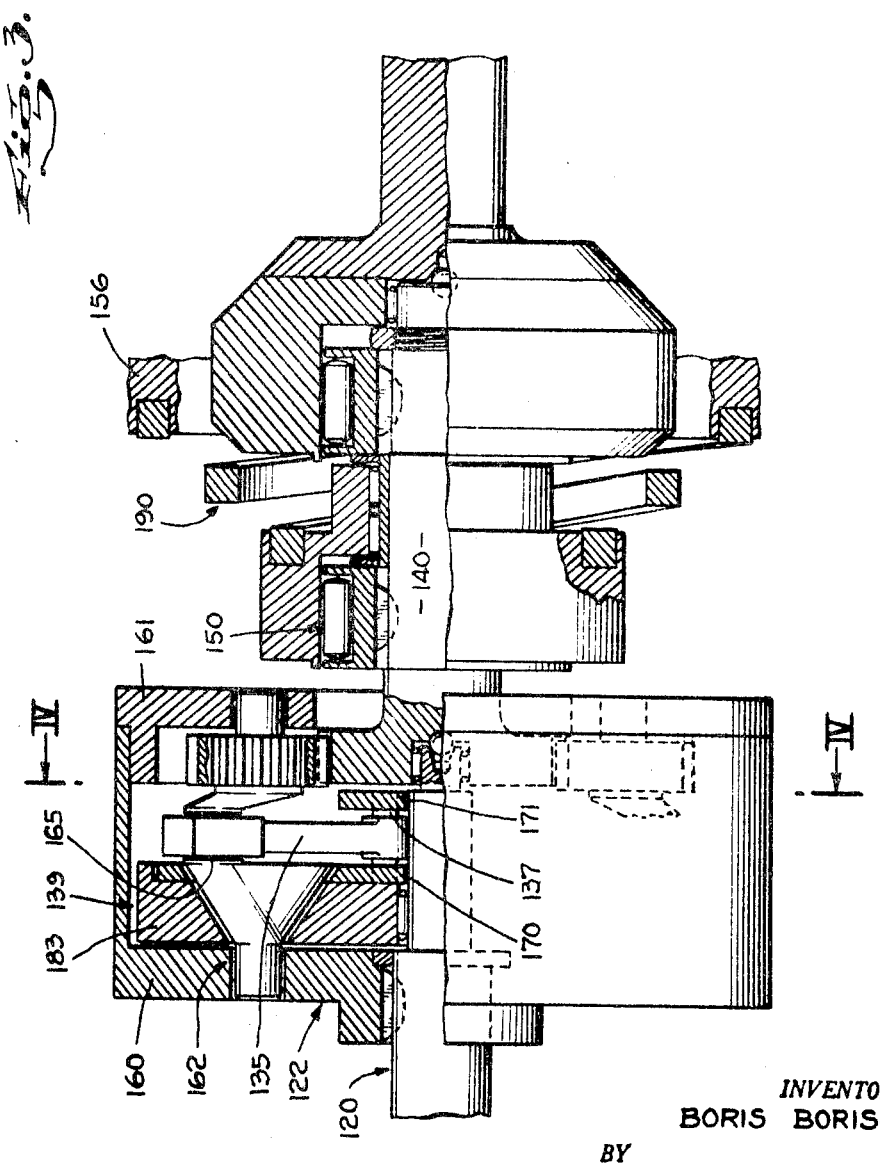

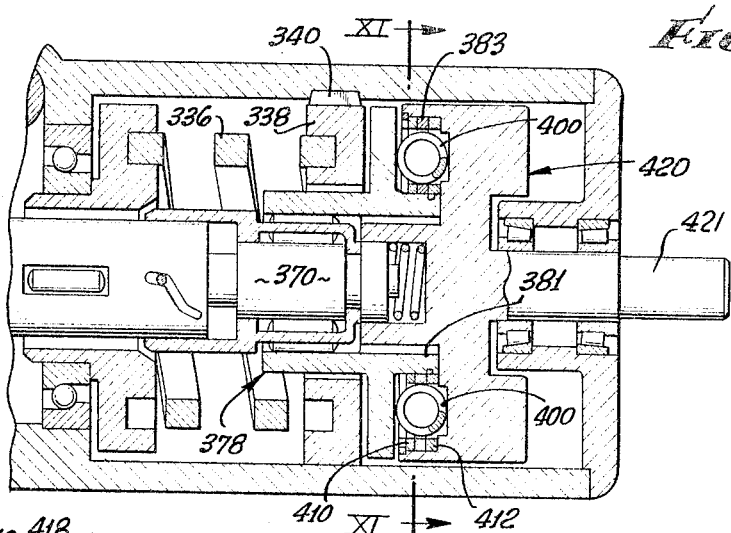
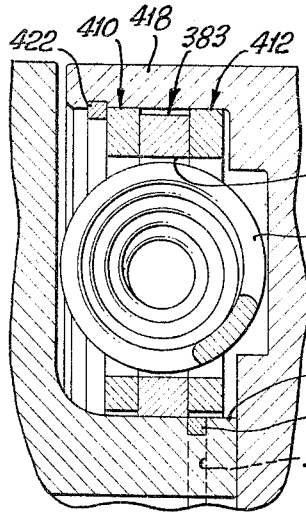
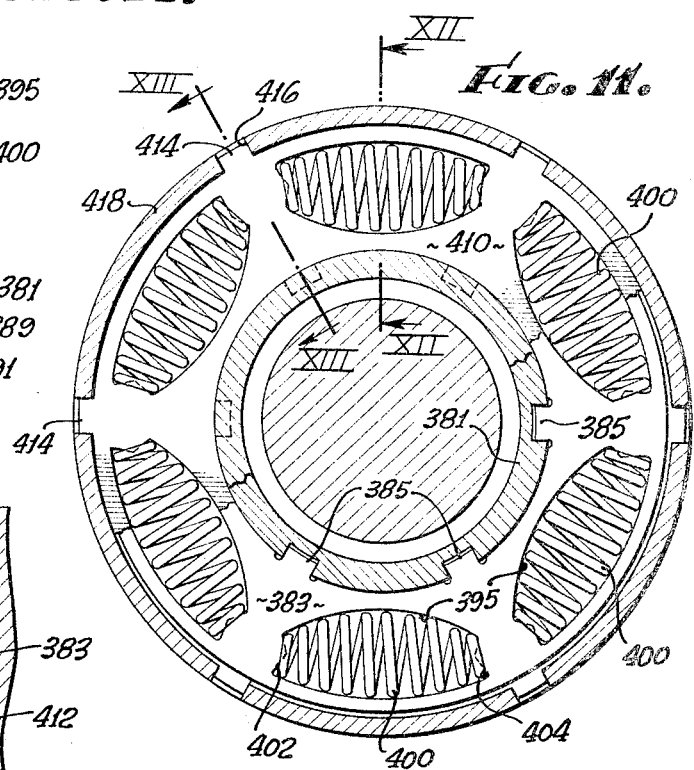
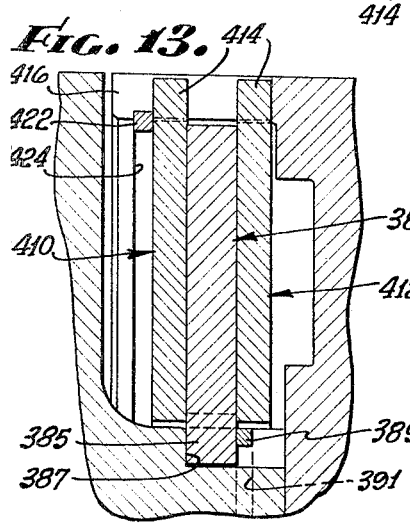

United States Patent Office 3,263,529
Patented August 2, 1966

3,263,529
TORQUE CONVERTER CONSTRUCTION
Boris Borisoff, Van Nuys, Calif., assignor to Tork-Link Corporation, North Hollywood, Calif., a corporation of California
Filed June 26, 1963, Ser. No. 290,660
13 Claims. (Cl. 74—751)

This application is a continuation-in-part of my earlier copending application Serial No. 144,006, filed October 4, 1961, now abandoned, which in turn was a continuation of my application Serial No. 848,810, filed October 26, 1959, now abandoned.

The present invention relates generally to improvements in torque converters and particularly in such devices wherein the difference of speed between the input and output shafts is made to cyclically vary the instantaneous energy content of one or more masses whereby to increase the output torque of the device over the input torque.

In accordance with preferred embodiments of the invention hereinafter shown and described, the device converts a difference in speed between the input and output shafts into increased torque available at the output shaft. The construction is such that this conversion of torque is accomplished at very high efficiency by the use of one or more oscillatingly rotating masses in a dynamically balanced system. It is characteristic of such masses that during one portion of a cycle the mass, by its change of speed, absorbs energy from the input source and, during another portion of the cycle, returns energy thus absorbed to the system and makes it available to the output shaft. In one form of the invention the mass whose energy content is thus varied may undergo its oscillatory rotations about an axis coincident with the input shaft axis; in another form of the invention such mass may move about an axis displaced from the input shaft axis.

A reaction section is provided in accordance with the present invention including means for rectifying the flow of power by resiliently absorbing power cyclically fed to it in a reverse rotational direction during one portion of the cycle and in a different portion of each cycle returning such power in a forward rotational direction to the output member of the device. A particular feature in accordance with a preferred form of the present invention is that the reaction section of the converter includes a spring-mounted oscillatable reaction member of substantial mass, and the spring rate of the resilient mounting of the reaction member is so chosen that it has a substantial resonant characteristic when the output shaft speed is at least about one-fourth of the input shaft speed. As a result of this construction the output power of the device is maintained substantially at rated value from maximum output shaft speed, i.e., zero slip, down to approximately 20% of maximum speed, i.e., a slip of about 80%. Thus the present device can be driven by a conventional source of power such as an electric motor or the like of a predetermined horsepower rating, and the power source will be loaded substantially to its full load capacity and the output torque of the converter available at the output shaft will vary substantially inversely as the speed of the output shaft over a very wide range of output shaft speed.

In the present converter, the oscillating parts tend to create vibrations having a frequency proportional to the slip and thus varying generally with load. In many applications it is important to minimize the transmission of such vibrations to a vehicle or other driven machine. If the resonant frequency of the entire system including the driven machine lies within the frequency range of the converter vibrations, which is not unlikely, the magnitude of the transmitted vibrations, if not isolated, might become prohibitive when the load conditions cause the converter to produce vibrations at or near such resonant frequency.

The present invention includes means tending to isolate such converter vibrations from the output shaft, particularly where heavy load causes the magnitude of the vibrations to be high, by providing in effect a torque filter using a spring system having spring rates which vary depending upon the load carried thereby. A preferred configuration includes barrel springs whose turns have helical diameters varying from a minimum at either end to a maximum in the center, so that the end turns of the springs are substantially stiffer than the central turns. Thus, under a light load, the major part of the total flexure of the spring occurs in its softer central turns, providing a relatively low spring rate; as the load increases, the softer central turns progressively "bottom," resulting in progressively higher spring rates. Since it is characteristic of the present converter that the frequency of vibrations increases generally with load, it will be seen that the ratio of the vibration frequency to the resonant frequency of the spring system can be maintained substantially constant over a wide range of load conditions. For reasons to be discussed below, effective vibration isolation requires that the ratio just mentioned be substantially greater than unity. Since, in the present converter, the numerator of that ratio becomes zero at zero slip, it is obvious that the ratio passes through unity, and the implications of this fact are discussed below.

It is known that, in an undamped system, transmissibility of vibrations having a given forcing frequency can be minimized by the use of an elastic medium, provided that the ratio of the forcing frequency to the natural or resonant frequency of the elastic medium is greater than 1.41; and the transmissibility approaches zero asymptotically as that ratio increases. See, for example, page 36 of Crede, Vibration and Shock Isolation, John Wiley & Sons, 1951; and FIG. 21, page 16–14, of Kent's Mechanical Engineers' Handbook, Design, Shop Practice, Eleventh Edition, John Wiley & Sons. The same references state, again assuming an undamped system, that the transmissibility rises to a very high value as the mentioned ratio approaches unity.

From the point just mentioned, it might seem that the load condition creating a unity ratio, i.e., where the vibration frequency is equal to the spring system resonant frequency, would result in transmission of vibrations of intolerably high magnitudes. Two factors militate against this. First, the spring system in accordance with the present invention includes members whose relative movement during operation produces some frictional damping. Secondly, the construction in accordance with the present invention contemplates that the unity ratio condition should occur at a low slip, where the oscillatory torque impulses have very small magnitude since the load is light. Thus the slip where the unity ratio condition occurs is preferably between about 2% and about 5%, corresponding in a typical system to a vibration frequency of between about 5 and 12 cycles per second.

Accordingly, it is a principal object of the present invention to disclose an improved torque converter employing oscillatingly rotating masses for increase of output torque. Other objects and purposes of the invention are to disclose a torque converter of the type referred to employing no hydraulic components and wherein as a consequence no greatly lower efficiency results at lowered output speeds; to provide a torque converter including easily operable and efficient means for driving the output shaft in reverse direction; to provide, in a reversible torque converter of the class described, novel reversing means by which to insure minimum wear on overrunning clutches and other components associated therewith; to disclose a torque converter operated on mechanical principles including a reaction section having a spring-mounted member, the spring so mounting the member having a spring rate such as to create a resonant condition at a selected speed which may preferably be approximately 25% of maximum output shaft speed; to provide in a torque converter an input section having an oscillatingly rotating mass adapted to rotate about the axis of the input shaft; to provide, in such a torque converter, a spring system having variable spring rates by which to minimize vibrations transmitted to the output shaft; to provide such a spring system in a torque converter of the type described wherein the ratio of the vibration frequency to the resonant frequency of the spring system is substantially greater than unity over a wide range of load conditions; and for other and additional purposes as will be made clear from a study of the following description of preferred embodiments of the invention taken in connection with the accompanying drawings, in which:

FIG. 1 is a perspective schematic showing of one form of the invention wherein the oscillatingly rotating masses of the input section rotate about axes displaced from the axis of the input shaft;

FIG. 2 is a perspective schematic showing of another form of the invention wherein the oscillatingly rotating mass of the input section rotates about an axis coincident with that of the input shaft;

FIG. 3 is a longitudinal view, partially in section, of a torque converter of the type similar to that illustrated in FIG. 2, the reaction section incorporating a spiral spring instead of the elongated helical springs schematically shown in FIG. 2;

FIGS. 4 and 5 are sectional views taken along the line IV—IV of FIG. 3 at different times in the operating cycle;

FIG. 6 is a longitudinal sectional view of a reversible torque converter in accordance with the invention;

FIG. 7 is a perspective showing of the reversing mechanism of the device of FIG. 6;

FIG. 8 is a sectional view on line VIII—VIII of FIG. 6;

FIG. 9 is a sectional view on line IX—IX of FIG. 6;

FIG. 10 is a fragmentary sectional view of a torque converter similar to the right hand portion of FIG. 6, but including a torque filter in accordance with the invention;

FIG. 11 is a sectional view taken in its upper and lower portions, along the upper and lower arrows XI respectively of FIG. 10;

FIGS. 12 and 13 are fragmentary sectional views on an enlarged scale taken on lines XII—XII and XIII—XIII respectively of FIG. 11.

Generally speaking, the major components of the present converter comprise: (1) an input section provided with one or more rotating masses which may undergo cyclic changes of speed as previously mentioned, the movement being referred to herein as oscillatory rotation; (2) a reaction section for cyclically storing power delivered to it in what may be called a "negative" direction of rotation and returning it cyclically to the system in a "positive" direction of rotation; and (3) an output section preferably including an inertia device such as a fly wheel or the like to smooth the speed of the output shaft, and including also, when used, torque filter means. Desirably the input section includes means engageable with a sun gear driving the reaction section by which to create cyclic or oscillatory variations of speed of the rotating mass; such means are herein illustratively shown as including planet gears meshing with the sun gear. Thus the input section may include a spider or the like having means for mounting a plurality of satellite or planet gears which may be spaced uniformly from the axis of the input shaft. The planet gears mesh with a sun gear which in turn is fixed to a converter shaft and, as a consequence of the rotational movement of the mass, the sun gear and converter shaft fixed thereto are caused to rotate. In the case of zero slip the planet gears do not rotate about their own axes, and the rotation of the sun gear and converter shaft will be in the same direction and at the same speed as that of the input shaft. Such rotation is carried by the converter shaft through overrunning clutch means to the output member such as a fly wheel or the like connected to an output shaft. Now, if conditions change on the output shaft so that it is caused to rotate at a lower speed than the input shaft, the converter shaft and the sun gear fixed hereto are caused to decrease in speed so that a slip exists between the speed of the input shaft and that of the converter shaft. Such slip manifests itself in a rotation of the planet gears about their own axes, and, by mechanism to be described hereinafter, by oscillations superimposed upon the existing rotational movement of the mass connected operatively to the planet gears. The magnitude of such superimposed oscillations may be great enough to cause the sun gear and the converter shaft fixed thereto to cyclically stop and reverse their direction of rotation. The converter shaft is provided with a second overrunning clutch having a direction characteristic opposite to that of the overrunning clutch of the output section first mentioned above. This second overrunning clutch or reaction clutch connects the converter shaft to a spring-mounted reaction member having means resiliently biasing the member toward a neutral position, and thus acting as a brake against reverse rotation of the converter shaft; thus cyclic reverse rotation of the converter shaft causes the reaction member to be displaced away from its neutral or equilibrium position, and energy is accordingly stored in the resilient biasing means, urging the reaction member toward its neutral position. As soon as the converter shaft has been braked to a stop by the reaction member and has hence undergone its maximum excursion in the negative rotational direction, the force thus stored in the resilient biasing means of the reaction system tends to move the reaction member back toward its neutral position and such movement may be transmitted through the overrunning clutch connecting the reaction member to the converter shaft. Thus a torque impulse is supplied to the converter shaft in the positive rotational direction and such impulse is accordingly transmitted through the first mentioned overrunning clutch in the output section to the output fly wheel and shaft.

Referring now in detail to the drawings and first to the schematic showing of FIG. 1, an input shaft indicated generally at 20 has mounted thereon a support spider indicated generally at 22 constituting means for mounting a plurality of planet gears desirably equally spaced from the axis of the shaft 20. In the present illustrative embodiment of the invention, the spider 22 includes arms 23 and 24 terminating upwardly in apertured bearing means 25 and 26 for rotatably mounting therein shafts 27 and 28 which carry thereon planet gears 29 and 30 in mesh with a sun gear indicated generally at 32. Each of the two planet gears 29 and 30 has fixed thereto a mass 33 and 34 respectively, these masses being eccentric relative to the axes of their support shafts 27 and 28 respectively.

The sun gear 32 is fixed to a converter shaft indicated generally at 40 which, at its end opposite the sun gear 32, is provided with overrunning clutch means indicated generally at 42 operatively connecting the converter shaft 40 to an output inertia member indicated generally at 44 which is desirably provided with an output shaft 46. The clutch 42 connecting the converter shaft 40 with the output member 44 may be referred to herein as the "action" clutch and serves to couple the converter shaft with the fly wheel when the converter shaft moves in a clockwise direction, as seen in FIG. 1, as indicated by the larger arrow 48 on the sun gear; action clutch 42 is in disengaged condition when the converter shaft 40 and the attached sun gear 32 move counterclockwise relative to the fly wheel 44.

The converter shaft 40 is coupled by means of a second overrunning clutch means indicated generally at 50 and referred to herein as the "reaction" clutch, to a reaction member indicated generally at 52. This latter member is resiliently mounted by suitable resilient means here diagrammatically shown as including springs 54 and 55 connected to fixed elements 56 and 57, whereby the reaction member 52 is permitted oscillatory movement about the axis of the converter shaft 40, being always urged to its neutral position by the resilient members 54 and 55. Thus the reaction system including the reaction member and its resilient mounting means constitutes a brake against rotation of converter shaft 40 transmitted to the reaction member.

Consider the system of FIG. 1 under conditions where the output shaft 46 is rotating at the same speed as that of the input shaft 20, i.e., when the slip is zero in the system. Under these conditions the centrifugal weights 33 and 34 do not rotate about their shafts 27 and 28 but remain in the position seen in FIG. 1 and consequently the planet gears 29 and 30 fixed to them also do not rotate about their axes but do revolve about the common axis of the input shaft 20, the converter shaft 40 and the output shaft 46. Under these conditions it will also be observed that the reaction section including the reaction clutch 50 and the reaction member 52 are inoperative. Now, as the torque required at output shaft 46 is increased by reason of increased requirement of the load or otherwise, the position of converter shaft 40 will be gradually retarded in phase relative to the position of the input shaft 20 until eventually the centrifugal force acting on the weights 33 and 34 will be overcome and those weights will make at least one complete revolution about their respective axes 27 and 28, thus permitting a difference in speed between the converter shaft 40 and the input shaft 20.

As weights 33 and 34 rotate about their respective axes 27 and 28, their centers of mass will be subjected to cyclic variations in speed. As the slip speed increases from zero, the frequency of such cyclic or oscillating rotational speed about the axis of input shaft 20 variations also increases, consequently increasing the magnitude of the acceleration and deceleration necessary to accomplish the speed variations. The reaction forces traceable to the cyclic acceleration and deceleration of the oscillating masses are transferred to the converter shaft 40 by way of sun gear 32, thus superimposing oscillating rotational impulses upon the existing positive rotation of converter shaft 40 and thereby tending to rotate converter shaft 40 in an alternately positive and negative direction with reference to the desired rotation of the output shaft 46. Positive rotation of the converter shaft 40 is transmitted to the output shaft 46 by action clutch 42, resulting in a positive torque impulse upon the output shaft 46. Negative rotation of the converter shaft 40 (if negative oscillatory pulses are of sufficient magnitude to actually cause negative rotation of the shaft) is transmitted through the reaction clutch 50 to the reaction member 52, and the force thus transmitted is stored in the distortion of the resilient members 54 and 55. As soon as maximum excursion of the reaction member 52 has occurred, the restoring forces stored in the resilient members 54 and 55 become operative to move the reaction member 52 toward its neutral position. When the speed of movement thus imparted to the reaction member 52 tends to exceed the speed of converter shaft 40, energy theretofore stored in the resilient members will be transmitted through the reaction clutch 50 to the converter shaft 40 in the form of a torque impulse. Such impulses further add to the total torque being transmitted by the converter shaft and appear in the fly wheel or output member 44 and the output shaft 46. Thus the device effectively multiplies torque supplied by the input shaft 20 so that an additional amount of torque is available at the output shaft 46.

In FIG. 2 is shown a system in accordance with the present invention similar in certain respects to that of FIG. 1 but differing in that the oscillatably rotating mass in the input section of the device, rather than consisting of weights 33 and 34 rotatable about axes displaced from the major input shaft axis 20, includes an oscillatable mass which rotates only about the axis of the input shaft. Certain advantages flow therefrom, particularly in that the device of FIG. 2 does not display so great a tendency to "lock in" to a condition of zero slip, which, generally speaking, is characteristic of the device of FIG. 1. In the showing of FIG. 2 the corresponding parts are indicated by reference characters 100 greater than those of FIG. 1. The planet gears 129 and 130 are provided with eccentrically mounted crank pins 133 and 134 on the outer ends of which are rotatably connected link arms 135 and 136 respectively, the inner ends of the link arms being rotatably and pivotally connected to crank pins 137 and 138 carried by an oscillating mass indicated generally at 139 and rotatably journaled upon the converter shaft 140. The shaft 140 is connected through the action clutch indicated generally at 142 to the fly wheel 144 and the output shaft 146 and also through the reaction clutch indicated generally at 150 to the brake comprising the resiliently mounted reaction member 152 suspended by the resilient members 154 and 155 from the fixed mounting members 156 and 157.

Operation of the device in accordance with FIG. 2 is similar in major respects to operation of the device of FIG. 1 heretofore described. Under conditions of zero output torque demand, and disregarding friction losses in the converter, the output speed and the input speed are equal. Under these conditions the planet gears 129 and 130 may not rotate about the axes of their individual shafts 127 and 128, but, of course, they do revolve about the axis of the input shaft 120 in accordance with the movement of the spider 122. As the torque requirement at the output shaft 146 increases, the speed of output shaft 146 falls below the speed of input shaft 120, i.e., the slip ceases to be zero. The planet gears 129 and 130 will then commence to rotate about their axes 127 and 128, thus transmitting to the oscillating mass 139 by means of the crank arms 135 and 136 an oscillatory rotational movement about the axis of the converter shaft 140. The rotational velocity of the reaction member 139 varies cyclically from a minimum to a maximum and the change of its rotational velocity represents flow of energy into it or out of it. Such alternating or oscillating flow of energy is reflected through the planet gears 129 and 130 to the sun gear 132 and its attached converter shaft 140. From the latter element, torque in the positive rotational direction is transmitted to output shaft 146 via action clutch 142. By way of the reaction clutch 150 rotational movement of the converter shaft in the negative direction, if any, will be transmitted into the resiliently mounted reaction member 152 and the energy thus transmitted will be stored in the resilient members 154 and 155. As in the case of the device of FIG. 1, such stored energy may be fed back into the system in a subsequent portion of the cycle manifesting itself in an additional torque impulse in the converter shaft 140 in the positive rotational direction, which is in turn transmitted through the action clutch 142 to the output shaft 146.

In FIG. 3 there is shown a partial longitudinal sectional view of a device corresponding in major important respects to the schematic showing of FIG. 2 except that springs schematically shown at 154 and 155 of FIG. 2 are changed in FIG. 3 to a spiral configuration as is illustrated by conical spring 190. In the device of FIG. 3, for convenience of construction, the crank pins 137 and 138 are connected to an intermediate member or equalizer plate which in turn drives the oscillating mass by abutting contact therewith. Thus, with particular reference to FIGS. 3, 4 and 5, the spider indicated generally at 122 mounted upon the input shaft 120 includes a hollow two-piece housing comprising mating members 160 and 161. A shaft indicated generally at 162 is rotatably journaled in these two members at 163 and 164. The shaft 162 has mounted thereon the planet gear 129 and includes also an offset portion 165 (corresponding functionally to the crank pin 133 in FIG. 2) on which the lower end is rotatably connected to the pivot or wrist pin 137. The latter pin is carried by a pair of spaced flanges 170 and 171 of an equalizer plate indicated generally at 172 and best seen in FIGS. 4 and 5. The equalizer plate 172 constitutes a connecting means between the oscillatory movement of the crank pins 137 and 138 and the oscillating mass indicated generally at 139 which is coaxially mounted relative to the input shaft 120 and, in the illustrative embodiment of the invention seen in FIG. 3, is journaled on the input shaft 120 as distinguished from the schematic showing in FIG. 2 wherein mass 139 is journaled upon the converter shaft 140. The equalizer plate 172 is provided with a number of arcuately extending openings corresponding in number to the number of planet gears employed in the system. Thus, as appears in FIGS. 4 and 5, there are two such arcuate openings indicated generally at 175 and 176 and the outer periphery of the equalizer plate 172 includes means for providing a driving connection between the plate and the oscillating mass 139. In the present embodiment of the invention such means include outwardly projecting lugs 177 and 178 received in corresponding recesses 179 and 180 formed in the periphery of the oscillating mass 139. It is to be noted that the oscillating mass 139 is a relatively heavy member having formed therein a pair of arcuately extending and arcuaetly spaced openings corresponding to the openings 175 and 176 or the equalizer plate 172, whereby to permit movement of the offset portion 165 of the shaft 162 therethrough. The oscillating mass 139, as seen in FIG. 3, includes an outer portion 183 and an inner portion 184.

Comparison of FIGS. 4 and 5 will illustrate the operateion of the present device as it pertains to the oscillatory movement of the equalizer plate 172 and the oscillating mass 139. FIGS. 4 and 5 represent the positions of the parts at substantially the extremes of movement during operation. It will be observed, keeping in mind that the position of journal 163 in the spider section 160 is a measure of the position of the input shaft, that the oscillating parts consisting of the equalizer plate and the oscillating mass can move through substantially 90° of arc relative to the input shaft during rotation of that shaft. Keeping in mind also that such oscillatory movement is, during one-half of the cycle, in the direction of movement of the input shaft and during the remainder of the cycle is in the opposite direction, it will be understood that rotational energy is cyclically supplied to and taken from the oscillating mass and transmitted from mass through the planet gears into the sun gear 132 as heretofore described.

It is advantageous in a torque converter that the source of power be loaded to substantially its rated capacity throughout as wide a range of output speeds as possible, thereby most efficiently using the power source. I have found that this can be achieved by providing in the reaction section of the present converter, spring means whose spring rate displays substantial resonant characteristics at a selected speed constituting a substantial proportion of maximum output shaft speed. Preferably the selected speed is at least about one-quarter of the maximum output shaft speed, i.e., of the zero slip speed. By this construction the horsepower available at the output shaft falls off only slightly if at all from maximum speed down to about 20% of maximum speed and the power source is hence used to substantially its full rated capacity over a very wide range of output speeds of the converter. Where not so wide a range is needed, the speed at which the spring means displays substantial resonant characteristics may be somewhat higher, e.g., one-third to one-half of the maximum output shaft speed.

The torque converter in accordance with the present invention is readily adapted to a construction permitting reversibility of the rotational direction of the output shaft. Such reversibility construction is applicable for either of the two major types of construction of the input section illustrated in FIGS. 1 and 2 and described hereinabove. In FIG. 6 there is shown a longitudinal sectional view of a torque converter in accordance with the present invention embodying reversibility characteristics, and details of the structure are illustrated in FIGS. 7, 8 and 9. In the illustrative embodiment of the reversible converter of FIG. 6 it will be seen that the input section is of the type illustrated in FIG. 1, with masses rotatable about axes spaced from the input shaft axis. The input section is housed in a frame member indicated generally at 200 and an input shaft 202 is journalled in one end of the frame by suitable bearing means 204 and has connected thereto or formed integrally therewith a spider consisting of a pair of mating spider sections 206 and 208. The spider provides for rotational journaling of a pair of eccentrically mounted weights 210 and 212 fixed to gear 214 and 216 respectively which in turn mesh with a sun gear indicated generally at 218 mounted upon a converter shaft indicated generally at 220.

Shaft 220 is provided with two separate overrunning clutches which in this form of the invention are bi-directional in character, and there are provided means selectively actuable by the operator to cause the two clutches to be overrunning in either of two directions, the overrunning characteristics of the two clutches always being in directions opposite to one another. Each of the two such clutches includes a polygonal portion on the shaft 220. In FIG. 8 is shown a polygonal portion 230 of the reaction overrunning clutch on the shaft 220, such clutch being indicated generally at 232. The reaction clutch 232 serves to interconnect the shaft 220 with a reaction member indicated generally at 234 which is journaled by bearing 224 within the frame housing 226. The reaction member 234 is spring-biased by suitable spring means 236 into a neutral position, the spring 236 being fixed at its right end as seen in FIG. 6 to a body member 238 which in turn is keyed at 240 to the frame housing 226. The overrunning clutch 232 includes a plurality of rotatable members such as rollers 242 serving to selectively make contact between the flats of the polygonal section 230 and the cylindrical inner circumference 244 of the reaction member sleeve 232 in known manner. Means including a cage indicated generally at 250 and provided with slots 252 for receiving therein the rollers 242 are provided for determining the directional characteristic of the overrunning clutch 232. Cage 250 is rotatably supported as by being journaled upon rounded portions of polygonal shaft section 230 and is longitudinally, selectively movable by known means such as shifting fork as best seen in the perspective view of FIG. 7. The fork is indicated generally at 262 and is mounted upon a shaft 264 having handle 265 for rotation about the axis of the shaft 264 thereby to produce longitudinal movement of cage 250 relative to the axis of converter shaft 220.

The second overrunning clutch on converter shaft 220, referred to above as the action clutch, is indicated generally at 270 in FIG. 6. Clutch 270 includes a polygonal portion 272 on converter shaft 220 and a plurality of rotatable members such as rollers 274 making selective engagement between the flats of the polygonal portion 272 and the cylindrical internal circumference 276 of the sleeve portion 278 of the output inertia member indicated generally at 279 connected to the output shaft 280. As in the case of the reaction clutch, the action clutch 270 is also provided with means including a slotted cage indicated generally at 282 for selectively controlling the directional characteristic of the clutch. The slotted cage 282 includes, in its left portion as seen in FIG. 6, a tubular neck 284 carrying a number of inwardly projecting pins 286 which are slidably received in angularly positioned slots 288 formed in a portion of the cage 250 slidably and rotatably received in neck 284.

The slots 288 include central sections of relatively steep slope and end portions 289 of shallower or more gentle slope. It will be seen that relative longitudinal movement of the two cages will, by reason of the sliding engagement of pins 286 in slots 288, cause the two cages to be rotated relative to one another, thus affecting the directional characteristics of the two clutches 232 and 270. Because the cages are angularly in effective mutually abutting relation, the cages and their respective overrunning clutches will be urged into their positions with equal force. It is to be noted that the clutch positions are such that the directional characteristics of the two clutches are mutually opposed when the cages are relatively rotated into either of their extreme positions. Furthermore, the operation of the present clutches contemplates extremely frequent reversals of direction by converter shaft 220, and accordingly there is a possibility that the clutches might not be retained in their proper position because of the rapid acceleration and deceleration of the converter shaft. The relatively shallow end portions 289 of the slots 288 are provided to minimize this possibility and, together with the normal friction of the shifting fork 262 and its shaft 264, serve to virtually insure that the direction selector will remain in the position to which it is moved until it is moved therefrom by the operator.

In the position shown in the drawings, and assuming that input shaft 202 rotates clockwise as seen from the left in FIG. 6, the converter is arranged for forward rotation, i.e., with the output shaft rotating in the same direction as the input shaft. Movement of shifting fork 262 to its opposite position serves to place the converter in condition for reverse operation.

Spring 290 biases leftwardly the outer race of bearing 292 in order to effectively preload the bearing and thereby insure traction for the balls and prevent damage to the races during the periods of high acceleration which are characteristic of the operation of the converter.

It is to be observed that, in the form of the invention first shown and described in connection with FIG. 1, the oscillatably rotating masses are mounted upon axes spaced from the axis of input shaft 20 and are symmetrically arranged, i.e., both are in their outermost positions at the same time. Thus, in spite of the fact that they may be thought of as rotating about their individual axes, their combined mass is also effectively rotating about the axis of input shaft 20, as is perhaps more obviously the fact in the embodiment of FIG. 2.

In FIGS. 10, 11, 12 and 13 is shown a torque converter provided with a torque filter in accordance with the invention by which to minimize transmission of vibrations from the oscillating parts of the converter to the output shaft. As there shown, similar to the corresponding parts seen in FIG. 6, the coil spring 336 is anchored in member 338, which is in turn keyed at 340 to the housing of the converter. The converter of FIG. 10, except as shown and to be now described, is identical to the converter shown in FIG. 6. Torque is transmitted through the second overrunning clutch 370 to an output driver member indicated generally at 378, which effectively constitutes the output shaft of the converter as well as the input shaft of the torque filter; it may conveniently be referred to as an intermediate output shaft. From this shaft torque is transmitted through an elastic system in accordance with the invention to an output driven member indicated generally at 420 formed integrally with the final output shaft 421. Intermediate output shaft or output driver 378 includes a rightwardly extending annular collar 381, which carries on its outer surface a spring carrier driven plate indicated generally at 383 and seen in the lower portion of FIG. 11. As appears there and in FIG. 13, driver plate 383 is provided with a plurality of inwardly extending lugs 385 received in complementary grooves 387 formed in the outer surface of the collar 381, thereby locking driven plate 383 against rotation relative to the output driver 378. Means are provided for retaining the output driver plate in such locking engagement with the output member 378, such means here taking the form of a snap ring 389 received in a peripheral groove 391 formed in the outer surface of collar 381 immediately rightwardly of the driver plate 383, ring 389 being in snug abutting engagement with the lugs 385.

Output driver plate 383 is provided with a plurality of spring-receiving openings 395 extending therethrough, each opening being adapted to receive one of the driving springs indicated generally at 400 between end walls 402 and 404 defining the openings 395. The springs 400 serve to springingly transmit torque from the driver plate 383 to a pair of spring carrier driven plates indicated generally at 410 and 412 flanking the driver plate 383 and having spring-receiving openings identical in size, number and location to those of plate 383. These driven plates are identical to one another and, as best seen in the upper portion of FIG. 11, they are locked to collar 418 of the output driven member 420 by outwardly extending lugs 414 keyed into longitudinal grooves 416 formed in the inner annular surface of the collar 418. The assembly of the three carrier plates 383, 410 and 412 is retained in assembled sandwich-like relation as seen in FIGS. 10, 12 and 13 by suitable retaining means such as snap ring 422 received in an annular groove 424 immediately adjacent the left edge of the lugs 414, and in close abutting relation with the base portions of the lugs and with an outer annular portion of plate 410. The abutting faces of plates 383, 410 and 412 are ground to a very smooth finish to minimize friction therebetween, and the faces may be lubricated for the same purpose, by conventional means not shown.

It will accordingly be seen that output torque which reaches output driven member 420 and its output shaft necessarily passes through the spring system including the spring carrier plates 383, 410 and 412; and to the extent that output member 378 and its plate 383 receive periodic output torque impulses from clutch 370, the springs 400 must flex in transmitting such impulses to driven member 420.

As brought out previously herein, in the introductory discussion of the authorities, vibration transmission through an elastic system is minimized when the forcing frequency is large relative to the natural or resonant frequency of the system. In an undamped system, the authorities state that the transmissibility is given by the equation:

$$e = \frac{1}{r^2 - 1}$$

where $r$ is the ratio of forcing to resonant frequency.

In a torque converter of the present type, where the forcing frequency is proportional to slip which in turn is a function of load, the forcing frequency may have any value over a wide range, from zero at no load to several hundred cycles per second at heavy loads. Since complete vibration isolation is practically unattainable, efficient design requires that some reasonble value of isolation be selected as tolerable. If, for example, design considerations permit a vibration transmissibility of no more than about 4%, then the natural or resonant frequency of the spring system throughout the major part of the operating range should be no greater than about one-fifth of the forcing frequency (solving the above equation for $r$ when $e=0.04$). But a conventional constant spring rate elastic system having a sufficiently low spring rate or resonant frequency to provide such effective isolation at lower meaningful forcing frequencies would have to be extremely large in order to carry maximum torque loads. And since such maximum loads in the present converter occur with high forcing frequencies the spring system can be permitted to be much stiffer, i.e. it can be permitted to have much higher resonant frequencies, at heavy loads and nevertheless comply with the design criterion of no more than, say, about 4% vibration transmissibility over most of the operating range.

In the present illustrative embodiment of the invention, the maximum effective resonant frequency of the torque filter spring system occurs at a large output torque load, sufficient to just bottom the stiffest turns of the springs 400. The invention contemplates that, for reasonably effective vibration isolation, such maximum resonant frequency have a value which is small relative to the frequency of vibrations existing at that point, preferably no more than about one-fourth of such vibration frequency (corresponding to a transmissibility of less than 7%). The invention further contemplates that the spring system resonant frequency decrease from such maximum value with decrease of output torque load, remaining small relative to the decreasing vibration frequency over most of the operating range.

As previously pointed out, in the present converter the forcing or vibration frequency necessarily becomes equal to the spring system resonant frequency at some point during operation, which may be referred to as the "crossover" frequency. This point occurs at low output load in accordance with the present invention, preferably at less than about ten or twelve cycles per second, where the slip as well as the magnitude and frequency of vibrations are small. At and in the vicinity of the crossover point, where the forcing or vibration frequency is substantially less than about four times the spring system resonant frequency, the transmission of vibrations of objectionable magnitude is avoided both because the vibrations themselves are of small magnitude, and also because of the friction resulting from the moving contact between output driver plate 383 and the two output driven plates 410 and 412.

It is to be noted that the springs as seen in FIG. 11 are in their position of maximum length. In the illustrative form shown, the springs may be formed of music wire having a diameter of, say, 0.187 inch, formed so that the outside helical diameter of the end turns is about 0.75 inch and the outside helical diameter of the center turn is about 1.5 inches. Desirably the pitch is adjusted so that when the spring is fully loaded, i.e. with all turns bottomed, the wire will be substantially uniformly stressed throughout its length to the maximum allowable working stress of the material used.

It will be understood that angular movement of the driver plate 383 relative to the driven plates 410 and 412 shortens the common effective length of the spring-receiving openings in the three plates and thus imposes a compressive stress on the springs longitudinally thereof. Initially, with light load, the less stiff turns near the center absorb most of the longitudinal compression, producing a relatively low resonant frequency. With increasing load those turns successively bottom, and the effective stiffness of the spring results from flexure of the increasingly stiffer turns toward the ends of the springs, whereby the resonant frequency increases with increasing load.

It will be readily understood by those skilled in the art that modifications and changes from the specific illustrative forms of the invention hereinabove shown and described may be made without departing from the spirit of the invention as defined by the following claims and such modifications and changes are intended to be embraced within the scope of such claims.

I claim:

1. In a torque converter for receiving rotational power through an input shaft and delivering rotational power through an output shaft and having an intermediate converter shaft operatively connected to said input and output shafts and subjected to oscillatory rotation when the input and output shafts' speeds differ, means for rectifying the motion of the converter shaft comprising a reaction member displaceable from a neutral position by converter shaft rotation in a given direction and unidirectional clutch means for transferring rotational power from the converter shaft to the output shaft when the former is rotating opposite said given direction: resilient means biasing said reaction member toward said neutral position and having a resonant characteristic when the output shaft speed is between about one quarter and about one half of the input shaft speed.

2. The invention as stated in claim 1 including a torque filter operatively connected between the converter shaft and the output shaft comprising an elastic system having a resonant frequency which varies from a maximum value at a large output torque load downwardly with decrease of said load, said maximum value being small relative to the frequency of converter shaft oscillatory rotation at said large output torque load.

3. The invention as stated in claim 2 wherein said maximum value is less than about one-fourth of the frequency of converter shaft oscillatory rotation at said large output torque load.

4. In a torque converter for receiving rotational power through an input shaft and delivering rotational power through an output shaft and having an intermediate converter shaft operatively connected to said input and output shafts and subjected to oscillatory rotation when the input and output shafts' speeds differ, means for rectifying the motion of the converter shaft comprising a reaction member displaceable from a neutral position by converter shaft rotation in a given direction, first bidirectional overrunning clutch means for coupling said converter shaft with the reaction member and second bidirectional overrunning clutch means for connecting the converter shaft with the output shaft and control means for simultaneously changing the directional characteristics of said clutch means, the directional characteristic of one clutch means being always opposite that of the other: resilient means biasing said reaction member toward said neutral position from either of two opposite directions and having a resonant characteristic when the output shaft speed is between about one quarter and about one half of the input shaft speed.

5. The invention as stated in claim 4 including a torque filter operatively connected between the converter shaft and the output shaft comprising an elastic system having a resonant frequency which varies from a maximum value at a large output torque load downwardly with decrease of said load, said maximum value being small relative to the frequency of converter shaft oscillatory rotation at said large output torque load.

6. The invention as stated in claim 5 wherein said maximum value is less than about one-fourth of the frequency of converter shaft oscillatory rotation at said large output torque load.

7. In a torque converter having an intermediate output shaft and wherein torque augmentation results from movement of a mass producing torque impulses at frequencies increasing with increase of output torque load, the provision of an output torque filter comprising an input shaft fixed to said intermediate output shaft, a final output shaft and an elastic system for transmitting torque from said input shaft to the final output shaft, said elastic system having a resonant frequency which varies from a maximum value at a large output torque load downwardly with decrease of said load, said maximum value being small relative to the torque impulse frequency at said large output torque load.

8. The invention as stated in claim 7 wherein said maximum value is less than about one-fourth of the torque impulse frequency at said large output torque load.

9. The invention as stated in claim 7 wherein said elastic system includes a spring which is longitudinally compressed by torque impulses and having a resonant frequency varying generally with compression load impressed thereon.

10. In combination: a torque converter producing output torque impulses in an intermediate output shaft at frequencies varying generally with output torque load and an output torque filter comprising an input shaft fixed to said intermediate output shaft, a final output shaft and an elastic system for transmitting torque from said input shaft to the final output shaft, said elastic system having a resonant frequency which varies from a maximum value at a large output torque load downwardly with decrease of said load, said maximum value being small relative to the frequency of said torque impulses at said large output torque load.

11. A torque filter for use with means for producing in an intermediate output shaft torque impulses at frequencies varying generally with output torque load comprising an input shaft fixed to said intermediate output shaft, a final output shaft and an elastic system for transmitting torque from said input shaft to the final outut shaft, said elastic system having a resonant frequency which varies from a maximum value at a large output torque load downwardly with decrease of said load, said maximum value being small relative to the frequency of said torque impulses at said large output torque load.

12. The invention as stated in claim 11 wherein said maximum value is less than about one-fourth of the torque impulse frequency at said large output torque load.

13. The invention as stated in claim 11 wherein said elastic system includes a spring which is longitudinally compressed by torque impulses and having a resonant frequency varying generally with compression load impressed thereon.

References Cited by the Examiner

UNITED STATES PATENTS

| | | | |
|---|---|---|---|
| 1,461,557 | 7/1923 | Reece | 74—752 |
| 1,928,244 | 9/1933 | Berlin | 74—751 |
| 3,013,446 | 12/1961 | Charpentier | 74—752 |
| 3,154,971 | 11/1964 | Cicin | 74—752 |

FOREIGN PATENTS

| | | |
|---|---|---|
| 632,082 | 9/1927 | France. |
| 1,046,357 | 7/1953 | France. |
| 218,342 | 7/1907 | Germany. |
| 635,433 | 8/1936 | Germany. |

DAVID J. WILLIAMOWSKY, *Primary Examiner.*

DON A. WAITE, *Examiner.*

L. H. GERIN, *Assistant Examiner.*